(12) United States Patent
Saito (10) Patent No.: US 7,626,954 B2
(45) Date of Patent: Dec. 1, 2009

(54) COMMUNICATION APPARATUS AND CONTROL METHOD THEREOF

(75) Inventor: Tetsuji Saito, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 164 days.

(21) Appl. No.: 12/038,713

(22) Filed: Feb. 27, 2008

(65) Prior Publication Data

US 2008/0205306 A1 Aug. 28, 2008

(30) Foreign Application Priority Data

Feb. 28, 2007 (JP) ............................. 2007-050225

(51) Int. Cl.
*H04L 5/16* (2006.01)
(52) U.S. Cl. ...................... 370/282; 370/296
(58) Field of Classification Search ................ 370/282, 370/293, 296
See application file for complete search history.

(56) References Cited

U.S. PATENT DOCUMENTS

| 2009/0091656 | A1* | 4/2009 | Kitaru et al. | ............... 348/554 |
|---|---|---|---|---|
| 2009/0116583 | A1* | 5/2009 | Lida et al. | ................. 375/296 |
| 2009/0141180 | A1* | 6/2009 | Kondo et al. | ............... 348/723 |

FOREIGN PATENT DOCUMENTS

| JP | H07-222127 A | 8/1995 |
|---|---|---|
| JP | 2000-83209 A | 3/2000 |
| JP | 2001-136509 A | 5/2001 |

OTHER PUBLICATIONS

Japanese Office Action dated Feb. 13, 2009.

* cited by examiner

*Primary Examiner*—Melvin Marcelo
(74) *Attorney, Agent, or Firm*—Canon USA Inc IP Division (57) ABSTRACT

There is provided a communication apparatus that includes: a data communication unit which performs half-duplex communication of video frame data with an external device on a video frame-by-video frame basis, a switching unit which switches a transmission direction in which the data communication unit transmits the video frame data, a first control unit which controls the data communication unit to include a start command in the video frame data and send the video frame data, as well as controls the switching unit to switch the transmission direction in response to completion of the sending of the video frame data that includes the start command, and a second control unit which controls the switching unit to switch the transmission direction in response to completion of the reception of the video frame data that includes the start command.

15 Claims, 8 Drawing Sheets

COMMUNICATION APPARATUS AND CONTROL METHOD THEREOF

BACKGROUND OF THE INVENTION

1. Field of the Invention

The present invention relates to a communication apparatus that communicates data with an external device on a frame-by-frame basis, and to a control method thereof.

2. Description of the Related Art

At present, connecting a display device such as a digital television (DTV) to a recording device such as a hard disk recorder (HDR) and transmitting video data, audio data, and the like (referred to collectively as "AV data" hereinafter) stored in the recording device to the display device is commonly carried out. HDMI (High-Definition Multimedia Interface) is known as a digital interface for connecting recording devices with display devices. Meanwhile, DVI (Digital Visual Interface) is known as a digital interface for connecting PCs (Personal Computers) with display devices. With interfaces such as DVI and HDMI, video data is communicated on a frame-by-frame basis. However, DVI supports only the communication of video data; with DVI, the communication of audio data is not supported.

Devices that combine a recording device with a playback device in a single package, such as a DTV equipped with HDR functionality (an HDR-equipped DTV), are becoming widespread. It is preferable for an HDR-equipped DTV to have functionality for receiving video data from other recording devices and sending video data to other display devices, or in other words, to have functionality for bi-directional communication of video data.

However, interfaces such as DVI and HDMI are only capable of sending video data in a single direction. Furthermore, like video data, HDMI can only send audio data in a single direction. For this reason, with the DVI and HDMI interfaces, it has been necessary to utilize two of such interfaces in order to realize bi-directional communication of video data or AV data comprising video data and audio data.

A technique for performing bi-directional data communication using blanking intervals (see Japanese Patent Laid-Open No. 2001-136509) is known as a response to this problem. Furthermore, configuring analog V and A cables to be capable of bi-directional transmission, adding a control signal line, and implementing this structure in a single connector to be used as a cable for connecting a backup VTR is also known (see Japanese Patent Laid-Open No. 2000-83209).

However, Japanese Patent Laid-Open No. 2001-136509 does not disclose switching the transmission direction of data in periods aside from the blanking intervals.

Moreover, Japanese Patent Laid-Open No. 2000-83209 discloses neither a specific configuration for switching the transmission direction nor the sequence through which the switch is carried out.

In other words, with Japanese Patent Laid-Open No. 2001-136509 and Japanese Patent Laid-Open No. 2000-83209, it is not possible to switch the transmission direction of data in a communication apparatus that communicates data on a frame-by-frame basis (this typically refers to video data, but is not limited thereto).

SUMMARY OF THE INVENTION

Having been conceived in light of such a situation, it is a feature of the present invention to provide a technique for making it possible to switch the transmission direction of frame data, thereby implementing bi-directional communication of frame data, in a communication apparatus that communicates data on a frame-by-frame basis.

According to a first aspect of the present invention, there is provided a communication apparatus that includes: a data communication unit which performs half-duplex communication of video frame data with an external device on a video frame-by-video frame basis, a switching unit which switches a transmission direction in which the data communication unit transmits the video frame data, a first control unit which, when the transmission direction is to be switched while the data communication unit is sending the video frame data, controls the data communication unit to include a start command for instructing a start of a transmission direction switch, in the video frame data that is being sent, and send the video frame data, as well as controls the switching unit to switch the transmission direction in response to completion of the sending of the video frame data that includes the start command, and a second control unit which, when the start command is included in video frame data that is being received by the data communication unit, controls the switching unit to switch the transmission direction in response to completion of the reception of the video frame data that includes the start command.

According to a second aspect of the present invention, there is provided a communication apparatus that includes: a data communication unit which performs half-duplex communication of video frame data with an external device on a video frame-by-video frame basis, a control signal communication unit which communicates control signals with the external device asynchronously with respect to communication by the data communication unit, a switching unit which switches a transmission direction in which the data communication unit transmits the video frame data, a first control unit which, when the transmission direction is to be switched while the data communication unit is sending the video frame data, controls the control signal communication unit to send a start command for instructing a start of a transmission direction switch, as well as controls the switching unit to calculate an amount of video frame data that can be sent before the start command reaches the external device and is interpreted and switches the transmission direction in response to completion of the sending of video frame data of an amount greater than or equal to the calculated amount, and a second control unit which, when the control signal communication unit has received the start command while the data communication unit is receiving video frame data, controls the switching unit to switch the transmission direction in response to completion of the reception of the video frame data by the data communication unit.

According to a third aspect of the present invention, there is provided a control method for a communication apparatus, the communication apparatus including a data communication unit which performs half-duplex communication of video frame data with an external device on a video frame-by-video frame basis and a switching unit which switches a transmission direction in which the data communication unit transmits the video frame data, the control method comprising: controlling, when the transmission direction is to be switched while the data communication unit is sending the video frame data, the data communication unit to include a start command for instructing a start of a transmission direction switch, in the video frame data that is being sent, and send the video frame data, as well as controlling the switching unit to switch the transmission direction in response to completion of the sending of the video frame data that includes the start command, and controlling, when the start command is included in video frame data that is being received by the data communication unit, the switching unit to switch the transmission direction in response to completion of the reception of the video frame data that includes the start command.

According to a fourth aspect of the present invention, there is provided a control method for a communication apparatus, the communication apparatus including a data communication unit which performs half-duplex communication of video frame data with an external device on a video frame-by-video frame basis, a control signal communication unit which communicates control signals with the external device asynchronously with respect to communication by the data communication unit, and a switching unit which switches a transmission direction in which the data communication unit transmits the video frame data, the control method comprising: controlling, when the transmission direction is to be switched while the data communication unit is sending the video frame data, the control signal communication unit to send a start command for instructing a start of a transmission direction switch, as well as controlling the switching unit to calculate an amount of video frame data that can be sent in time until the start command reaches the external device and is interpreted and switch the transmission direction in response to completion of the sending of video frame data of an amount greater than or equal to the calculated amount, and controlling, when the control signal communication unit has received the start command while the data communication unit is receiving video frame data, the switching unit to switch the transmission direction in response to completion of the reception of the video frame data by the data communication unit.

Further features of the present invention will become apparent from the following description of exemplary embodiments with reference to the attached drawings.

DESCRIPTION OF THE EMBODIMENTS

Preferred embodiments of the present invention will now be described with reference to attached drawings. Each embodiment described below will be helpful in understanding a variety of concepts from the generic to the more specific.

It should be noted that the technical scope of the present invention is defined by claims, and is not limited by each embodiment described below. In addition, not all combinations of the features described in the embodiments are necessarily required for realizing the present invention.

Hereinafter, an embodiment in which the present invention is applied in HDMI (High-Definition Multimedia Interface) shall be given as an example of a communication apparatus. However, it should be noted that all communication apparatuses utilizing a communication method that communicates data on a frame-by-frame basis (such as, for example, DVI (Digital Visual Interface)) can be applied in the present invention. The data communication path may be hard-wired or wireless. Furthermore, although video data is typically handled by the communication apparatus, the data handled is not intended to be limited to video data.

First Embodiment

<Communication Apparatus 100 Configuration>

Figure 1:
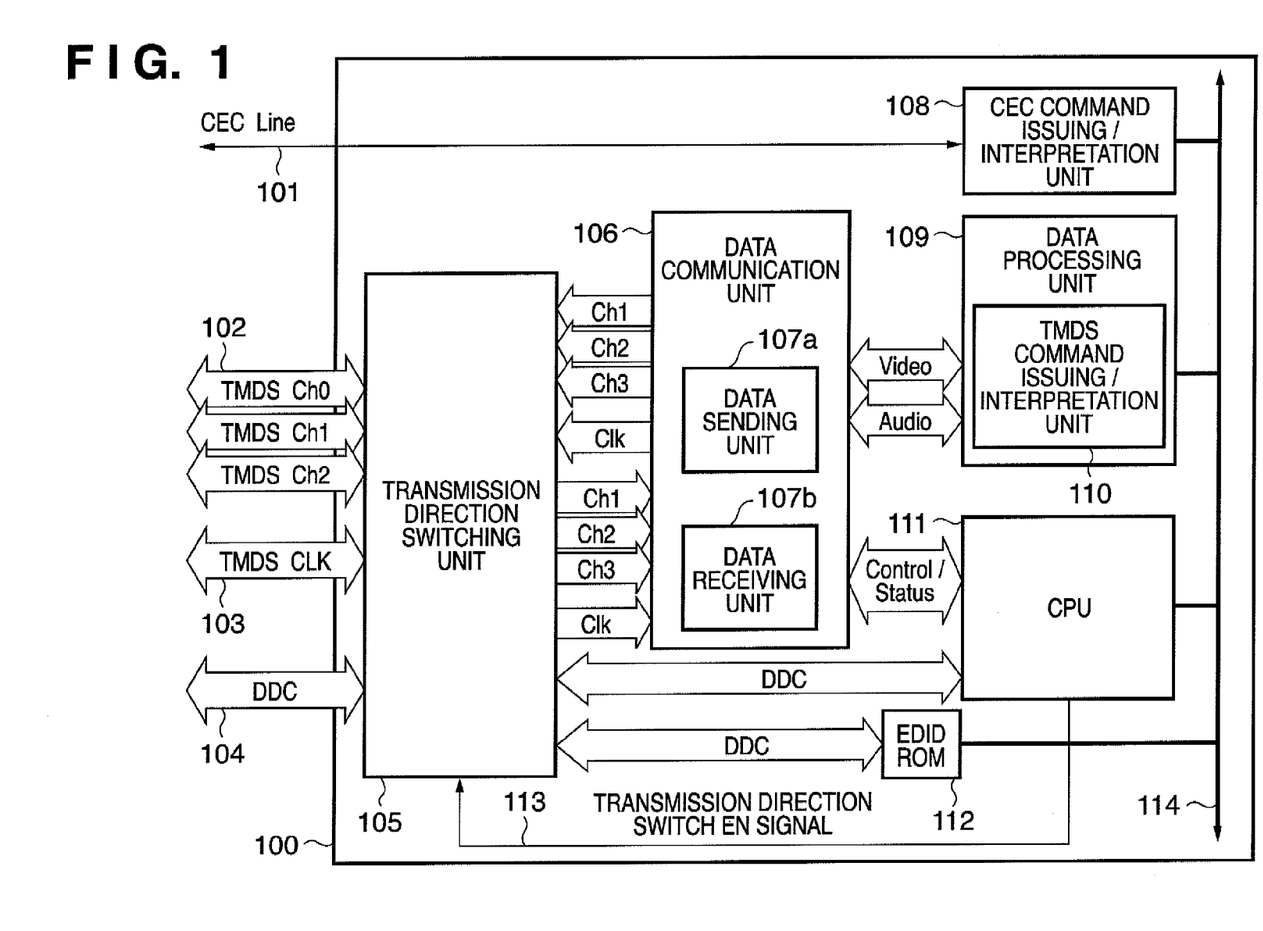
FIG. 1 is a block diagram illustrating an exemplary configuration of a communication apparatus according to a first embodiment of the present invention.

FIG. 1 is a block diagram showing an exemplary configuration of a communication apparatus 100 according to a first embodiment of the present invention. The communication apparatus 100 represents an improvement on the conventional HDMI system, carried out in accordance with the concept of the present invention.

The communication apparatus 100 includes a CEC (Consumer Electronics Control) line 101, a TMDS (Transition Minimized Differential Signaling) data line 102, a TMDS clock line 103, and a DDC (Display Data Channel) line 104 as lines (hard-wired or wireless) for communicating with an external device (another communication apparatus).

The CEC line 101 is a line for communicating control signals with the external device. The TMDS data line 102 is a line for communicating video data with the external device on a frame-by-frame basis. The TMDS clock line 103 is a line that supplies a clock signal for the TMDS data line 102. The DDC line 104 is a line for communicating setting information, status information and the like of the communication apparatus 100, another communication apparatus, and so on.

In the present embodiment, the TMDS data line 102 has three channels (Ch0, Ch1, and Ch2), but the TMDS data line may have any number of channels.

The communication apparatus 100 furthermore includes a transmission direction switching unit 105, a data communication unit 106, a CEC command issuing/interpretation unit 108, a data processing unit 109, and a CPU 111.

The transmission direction switching unit 105, which serves as an example of a switching unit, sets and switches the transmission direction of the data communication unit 106.

The data communication unit 106 includes a data sending unit 107a and a data receiving unit 107b, and communicates data with the external device on a frame-by-frame basis in the transmission direction set by the transmission direction switching unit 105. The data transmission direction can only be set to either sending or receiving, and thus the data communication unit 106 cannot send and receive data simultaneously. In other words, the data communication unit 106 is capable of bi-directional communication through half-duplex communication. Hereinafter, the direction in which the frame data flows in this half-duplex communication shall be defined as the transmission direction.

The CEC command issuing/interpretation unit 108, which serves as an example of a control signal communication unit, communicates various control signals (for example, a switch request for switching the transmission direction) via the CEC line 101. The CEC command issuing/interpretation unit 108 also generates (issues) and interprets the control signals that are sent/received. Here, the CEC command issuing/interpretation unit 108 can perform asynchronous bi-directional communication with the data communication unit 106.

The data processing unit 109 processes data in frame units (frame data) sent/received by the data communication unit 106. The data processing unit 109 includes a TMDS command issuing/interpretation unit 110. The TMDS command issuing/interpretation unit 110 generates (issues) and interprets control signals (for example, a start command that instructs switching of the transmission direction to be started) included in the frame data.

Figure 2:
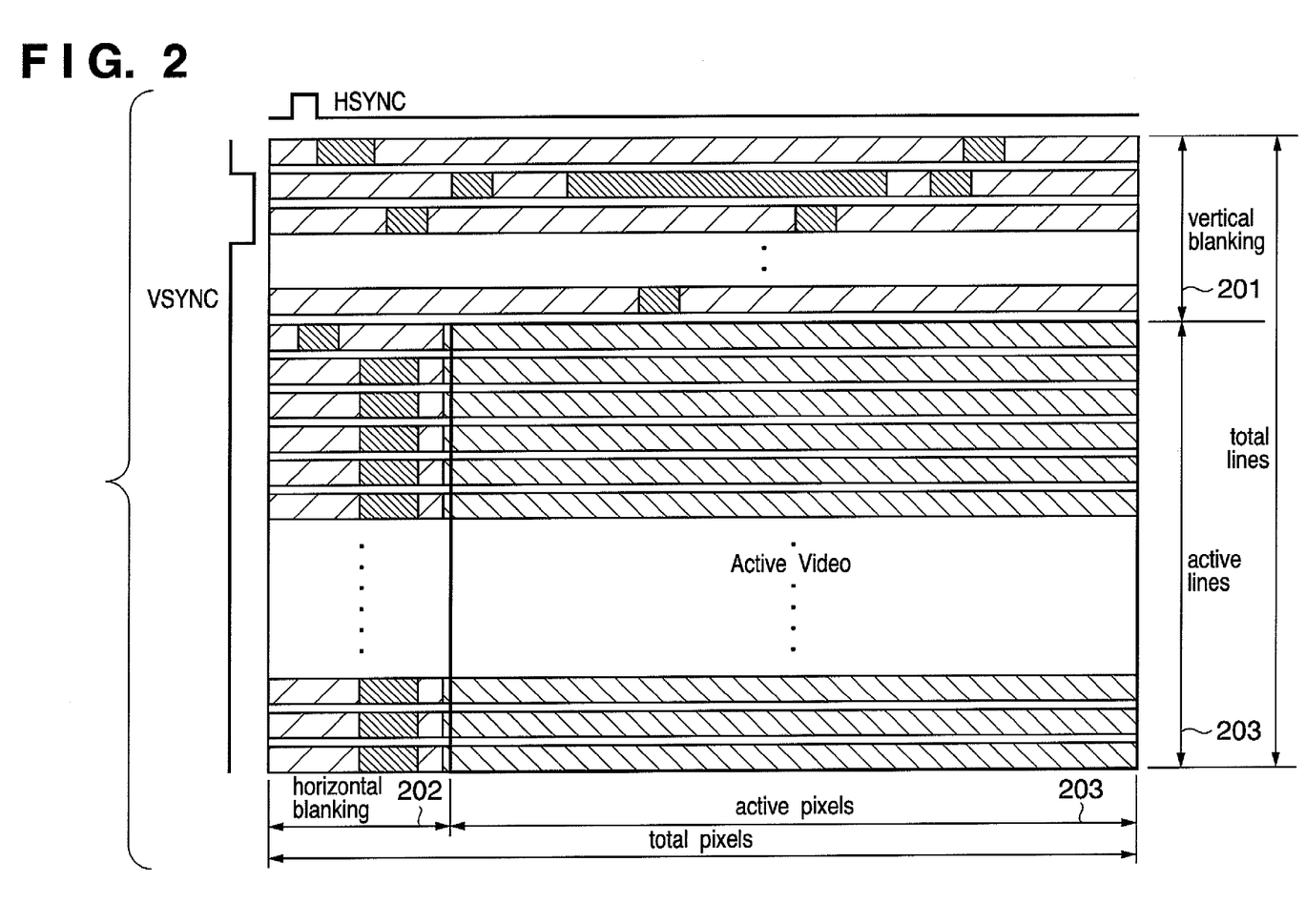
FIG. 2 is a diagram illustrating an example of frame data.

FIG. 2 is a diagram illustrating an example of frame data. The frame data includes a vertical blanking interval 201, a horizontal blanking interval 202, and an active interval 203. In other words, in the present embodiment, the frame data is video frame data having blanking intervals. When transmitting AV data via HDMI, the video data displayed in the display device is included in the active interval 203. Other data, such as audio data, control signals, and the like, is included in one or both of the vertical blanking interval 201 and the horizontal blanking interval 202. It should be noted that the control signals included in the blanking intervals are different from the CEC commands sent/received via the CEC line 101. While the control signals included in the blanking intervals are synchronized with frames and can be transmitted in only a single direction, the CEC commands sent/received via the CEC line 101 are asynchronous to the frames and are capable of bi-directional transmission. In the present embodiment, the start command that instructs switching of the transmission direction to be started is sent/received within the frame data (described in detail later). Although control signals such as the start command are normally included in a blanking interval (the vertical blanking interval 201 or the horizontal blanking interval 202) in order to avoid negatively affecting the video, the present embodiment is not limited thereto, and the control signals may be included in the active interval 203.

The CPU 111, which is one example of a control unit, controls the constituent elements of the communication apparatus 100. Specific examples of the controls carried out by the CPU 111 include instructing the CEC command issuing/interpretation unit 108 to issue and send control signals, performing controls based on the control signals having been notified of the results of the CEC command issuing/interpretation unit 108 interpreting control signals it received, and so on. Furthermore, the CPU 111 controls the transmission direction switching unit 105 to switch the transmission direction via a transmission direction switch EN (enable) signal line 113.

The communication apparatus 100 also includes an EDID (Extended Display Identification Data) ROM 112, which stores device information regarding the device in which the communication apparatus 100 is provided and the like.

The communication apparatus 100 furthermore includes a data bus 114, which is a data communication path internal to the communication apparatus 100.

<Flow of Frame Data Transmission Direction Switching Process (from Sending Side to Receiving Side)>

Figure 3:
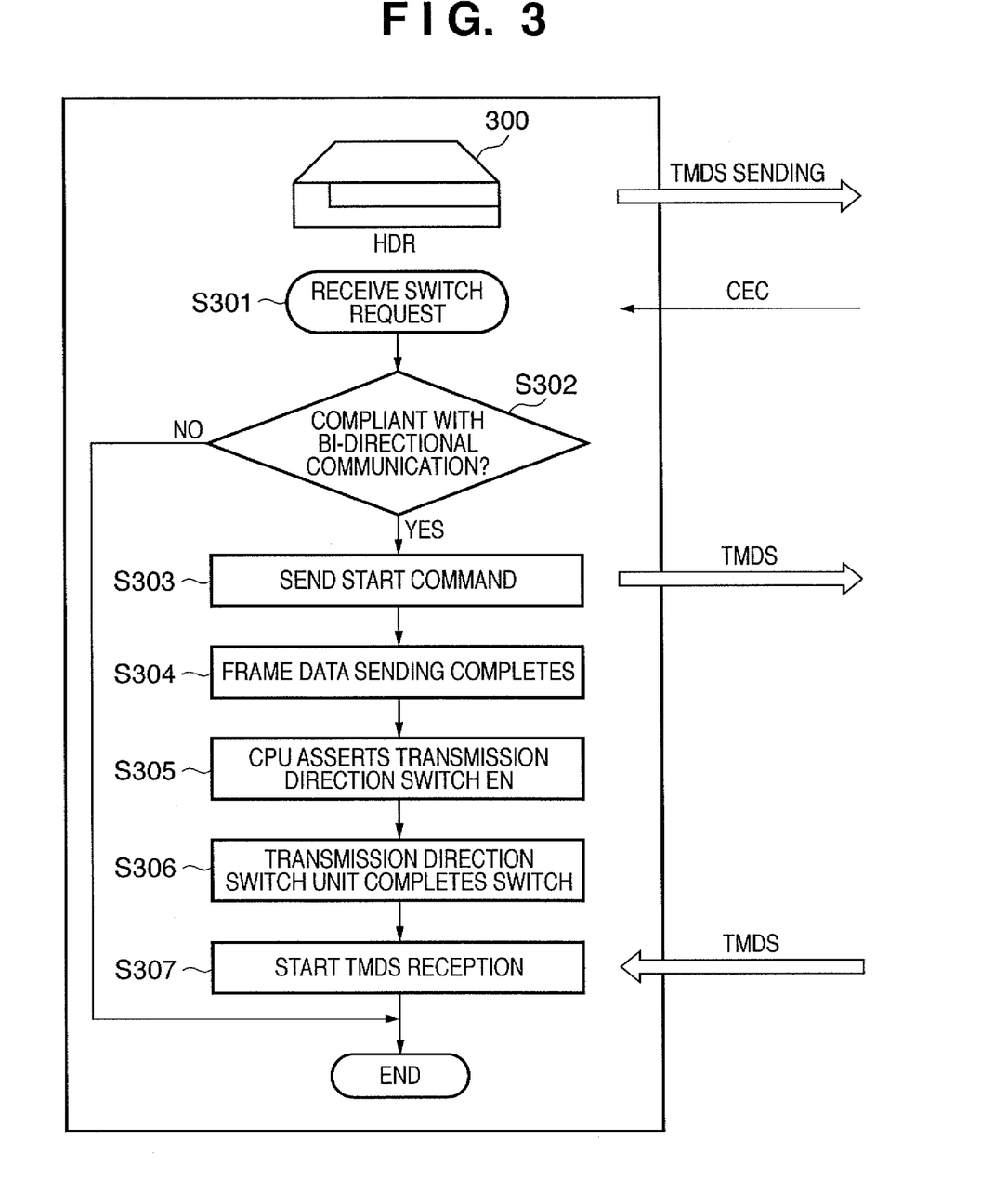
FIG. 3 is a flowchart illustrating the flow of a process for switching the transmission direction of data from the sending side to the receiving side, in a hard disk recorder (HDR) provided with the communication apparatus according to the first embodiment of the present invention.

FIG. 3 is a flowchart illustrating the flow of a process for switching the transmission direction of frame data from the sending side to the receiving side, in a hard disk recorder (HDR) 300 provided with the communication apparatus 100 according to the first embodiment of the present invention. In this flowchart, the HDR 300 is assumed to be sending data to an external device such as, for example, a digital television (DTV) (not shown).

In S301, the CEC command issuing/interpretation unit 108 commences the process illustrated in this flowchart upon receiving a switch request for switching the transmission direction.

In S302, the CPU 111 determines whether or not the communication apparatus 100 is compliant with bi-directional communication of frame data. In the present embodiment, it is assumed that the communication apparatus 100 is compliant with bi-directional communication of frame data, and thus the procedure moves to S303. If the communication apparatus 100 is not compliant with bi-directional communication of frame data, the CEC command issuing/interpretation unit 108 cannot interpret the switch request, and thus the CPU 111 does not execute the following processes, and the process in the flowchart ends (in other words, the switch request is ignored).

In S303, using the TMDS command issuing/interpretation unit 110 and the data communication unit 106, the CPU 111 includes a start command that instructs switching of the transmission direction to be started in the frame data (see FIG. 2) that is currently being sent, and sends the data to the external device. Note that it is preferable for this start command to include the device information stored in the EDID ROM 112 of the communication apparatus 100 that is sending the start command (the same applies hereinafter).

When, in S304, the frame data that includes the start command has been sent, in S305, the CPU 111 asserts a transmission direction switch EN signal to the transmission direction switching unit 105.

In S306, the transmission direction switching unit 105 switches the transmission direction of the data communication unit 106 from the sending side (source) to the receiving side (sink). After this, in S307, the data communication unit 106 commences the reception of frame data from the external device.

In this manner, the HDR 300 switches from the data sending side (source) to the data receiving side (sink) through the abovementioned process.

With regards to this flowchart, particular attention should be paid to the fact that the procedure moves to S305 after the frame that includes the start command is sent in S304. This makes it possible for the communication apparatus 100, which communicates data on a frame-by-frame basis, to switch the transmission direction in synchronization with the frames.

It should also be noted that although the HDR 300 switches the transmission direction of the frame data using the switch request received from the external device as a trigger in the flowchart in FIG. 3, the trigger is not limited to the switch request. For example, the HDR 300 may include a timekeeper, and may be configured to switch the transmission direction at a predetermined time. In this case, the communication apparatus 100 of the HDR 300 does not need to receive a switch request, and thus does not need to be provided with the CEC line 101 and the CEC command issuing/interpretation unit 108.

<Flow of Frame Data Transmission Direction Switching Process (from Receiving Side to Sending Side)>

Figure 4:
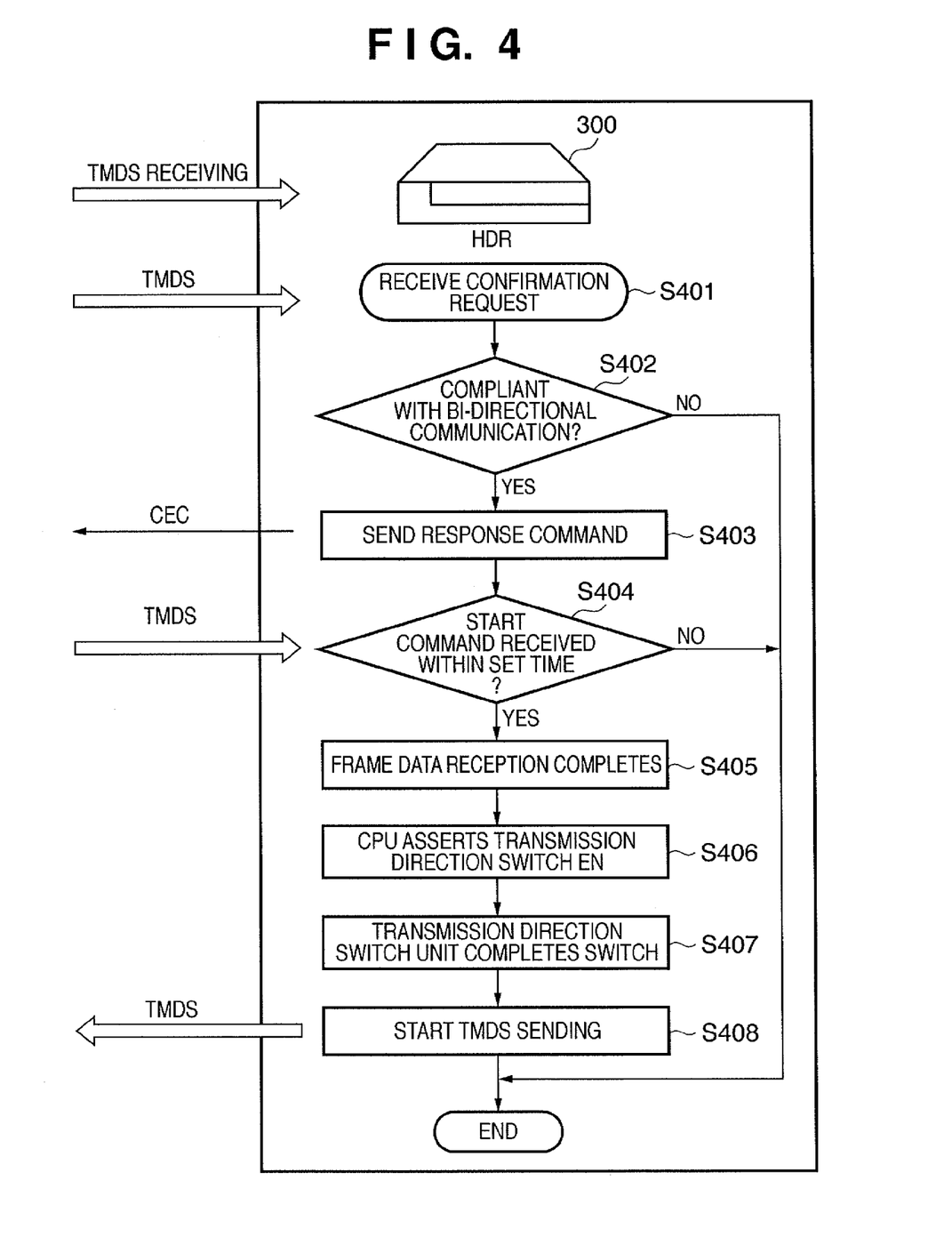
FIG. 4 is a flowchart illustrating the flow of a process for switching the transmission direction of data from the receiving side to the sending side, in an HDR provided with the communication apparatus according to the first embodiment of the present invention.

FIG. 4 is a flowchart illustrating the flow of a process for switching the transmission direction of frame data from the receiving side to the sending side, in a hard disk recorder (HDR) 300 provided with the communication apparatus 100 according to the first embodiment of the present invention. In this flowchart, the HDR 300 is assumed to be receiving data from an external device such as, for example, an HDR-equipped DTV (not shown).

In S401, the process illustrated in this flowchart is commenced upon the data communication unit 106 receiving frame data including a confirmation request for confirming whether or not the transmission direction of the frame data can be switched, and the TMDS command issuing/interpretation unit 110 interpreting the confirmation request.

In S402, the CPU 111 determines whether or not the communication apparatus 100 is compliant with bi-directional communication of frame data. In the present embodiment, it is assumed that the communication apparatus 100 is compliant with bi-directional communication of frame data, and thus the procedure moves to S403. If the communication apparatus 100 is not compliant with bi-directional communication of frame data, the TMDS command issuing/interpretation unit 110 cannot interpret the confirmation request, and thus the CPU 111 does not execute the following processes, and the process in the flowchart ends (in other words, the confirmation request is ignored).

In S403, the CEC command issuing/interpretation unit 108 sends a response command, indicating that the transmission direction of the frame data can be switched, to the external device.

If in S404 the data communication unit 106 receives the frame data including the start command after the response command of S403 has been sent and before a pre-set amount of time has passed, and the TMDS command issuing/interpretation unit 110 has interpreted the start command, the procedure moves to S405. If the start command has not been received before the pre-set amount of time has passed, it is conceivable that some sort of error has occurred, and thus the CPU 111 does not execute the following process, and the process in the flowchart ends.

When, in S405, the frame data that includes the start command has been received, in S406, the CPU 111 asserts a transmission direction switch EN signal to the transmission direction switching unit 105.

In S407, the transmission direction switching unit 105 switches the transmission direction of the data communication unit 106 from the receiving side (sink) to the sending side (source). After this, in S408, the data communication unit 106 commences the sending of frame data to the external device.

In this manner, the HDR 300 switches from the data receiving side (sink) to the data sending side (source) through the abovementioned process.

With regards to this flowchart, particular attention should be paid to the fact that the procedure moves to S406 after the frame data that includes the start command is received in S405. This makes it possible for the communication apparatus 100, which communicates data on a frame-by-frame basis, to switch the transmission direction in synchronization with the frames.

It should also be noted that in the flowchart in FIG. 4, the HDR 300 switches the transmission direction using the confirmation request received from the external device and the start command received thereafter as a trigger. However, in cases such as where the communication apparatus 100 of the HDR 300 is assumed to be compliant with bi-directional communication of frame data and the confirmation is not necessary, the confirmation request is also unnecessary. In such a case, the communication apparatus 100 of the HDR 300 executes the processes of S405 and after, using the reception of the start command in S404 as a trigger, and switches the transmission direction of the frame data. The communication apparatus 100 does not need to send a response command, and thus does not need to be provided with the CEC line 101 and the CEC command issuing/interpretation unit 108.

<Switch Command from a Remote Controller or the Like>

In the flowcharts shown in FIGS. 3 and 4, the HDR 300 receives a trigger (the switch request in S301, the confirmation request in S401, the start command in S404, etc.) for switching the transmission direction of the frame data from the external device, which serves as the communication partner. However, the HDR 300 may receive a trigger for switching the transmission direction via a different device from the external device (for example, a remote controller or console panel provided in the HDR 300). Descriptions of such a configuration shall be provided hereinafter with reference to FIGS. 5 and 6.

Figure 5:
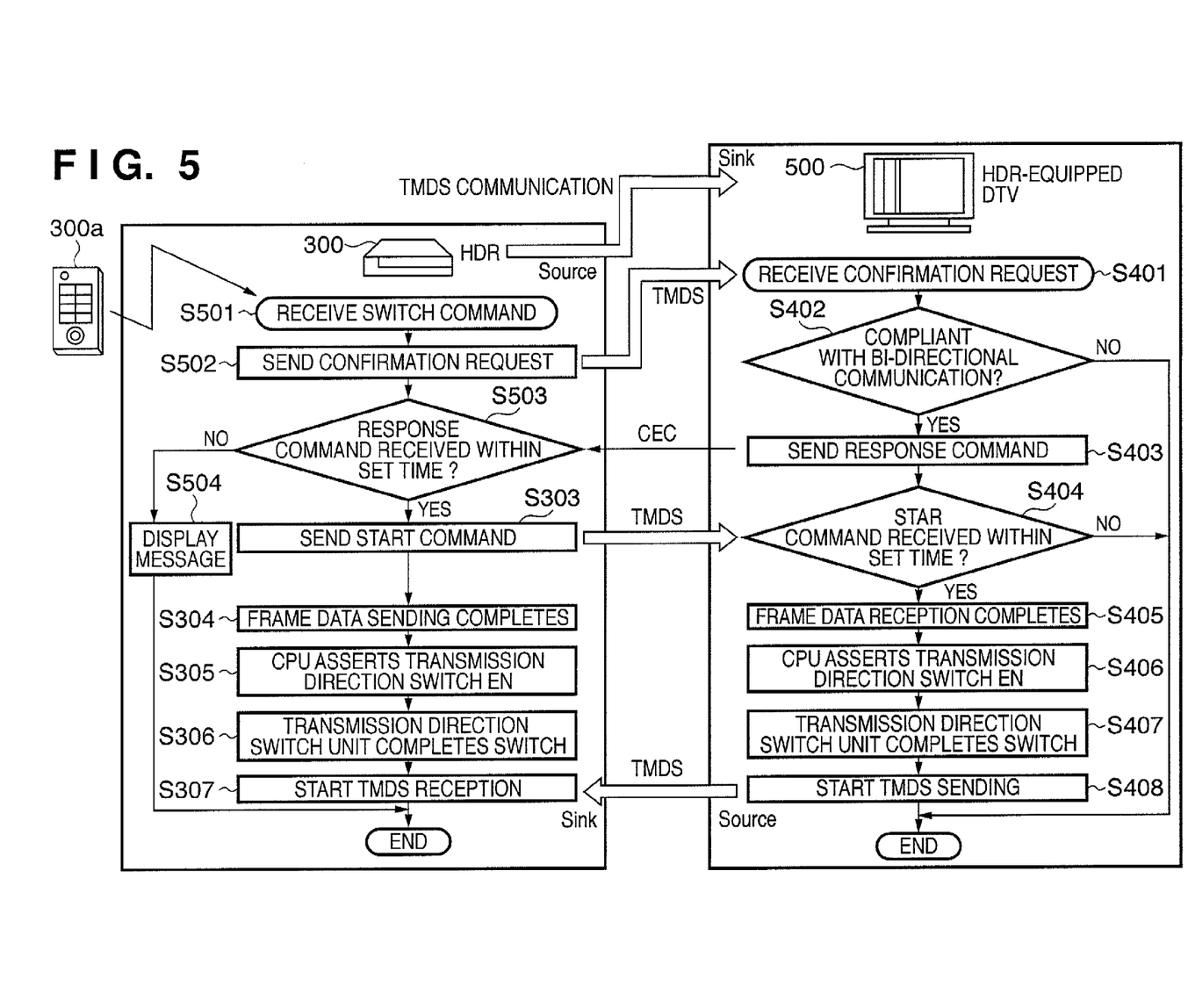
FIG. 5 is a flowchart illustrating the flow of a process executed in the case where an HDR has received a switch command, instructing the transmission direction to be switched, during sending of data to an HDR-equipped DTV provided with the communication apparatus according to the first embodiment of the present invention.
Figure 6:
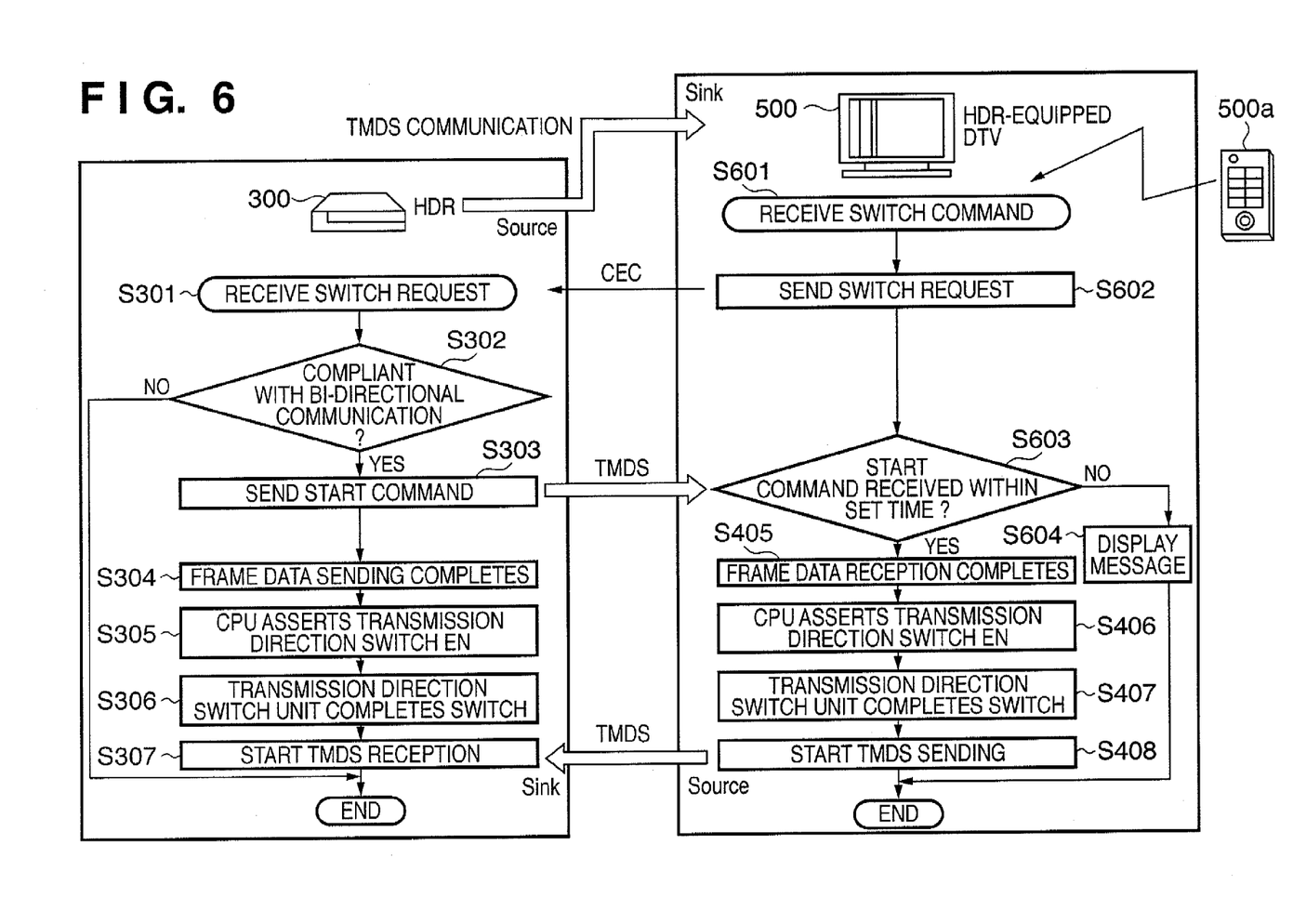
FIG. 6 is a flowchart illustrating the flow of a process executed in the case where an HDR-equipped DTV has received a switch command, instructing the transmission direction to be switched, during reception of data from an HDR.

Note that in FIGS. 5 and 6, steps that execute the same processes as in FIGS. 3 and 4 shall be given identical reference numbers, and descriptions thereof shall be omitted.

FIG. 5 is a flowchart illustrating the flow of a process executed in the case where the HDR 300 has received a switch command, instructing the transmission direction of the frame data to be switched, during sending of video data to an HDR-equipped DTV 500 provided with the communication apparatus 100 according to the first embodiment of the present invention.

The communication apparatus 100 of the HDR 300 in FIG. 5 is provided with a receiving unit (not shown) that receives a switch command, instructing the transmission direction of the frame data to be switched, via a remote controller 300a.

In S501, the receiving unit receives a switch command, after which the procedure moves to S502, where the data communication unit 106 sends frame data including a confirmation request for confirming whether or not the transmission direction can be switched.

If in S503 the CEC command issuing/interpretation unit 108 has received the response command after the confirmation request of S502 has been sent and before a pre-set amount of time has passed, the procedure moves to S303. If the response command has not been received before the pre-set amount of time has passed, the communication apparatus 100 of the external device (in FIG. 5, the HDR-equipped DTV 500) is considered to be unable to switch the transmission direction. Accordingly, in S504, the CPU 111 notifies the user of this fact by displaying a message in a display (not shown), which is one example of a notification unit, and the process in the flowchart ends. Note, however, that the notification unit is not limited to a visual means, and may be, for example, a buzzer or the like.

Furthermore, if sending of the confirmation request is not necessary, such as in the case where it is already known that the communication apparatus of the HDR-equipped DTV 500 is capable of switching the transmission direction of the frame data, S502 to S504 can be omitted.

FIG. 6 is a flowchart illustrating the flow of a process executed in the case where the HDR-equipped DTV 500 has received a switch command, instructing the transmission direction of the frame data to be switched, during reception of frame data from the HDR 300.

The communication apparatus 100 of the HDR-equipped DTV in FIG. 6 is provided with a receiving unit (not shown)

that receives a switch command, instructing the transmission direction to be switched, via a remote controller 500a.

In S601, the receiving unit receives a switch command, after which the procedure moves to S602, where the CEC command issuing/interpretation unit 108 sends a switch request.

If in S603 the data communication unit 106 receives the frame data including the start command after the switch request of S602 has been sent and before a pre-set amount of time has passed, and the TMDS command issuing/interpretation unit 110 has interpreted the start command, the procedure moves to S405. If the start command has not been received before the pre-set amount of time has passed, the communication apparatus 100 of the external device (in FIG. 6, the HDR 300) is considered to be unable to switch the transmission direction of the frame data. Accordingly, in S604, the CPU 111 notifies the user of this fact by displaying a message in a display (not shown), which is one example of a notification unit, and the process in the flowchart ends. Note, however, that the notification unit is not limited to a visual means, and may be, for example, a buzzer or the like.

While in the present embodiment, the device information is sent in the blanking interval of the frame data along with the start command, the device information may be included in, for example, the final sent frame data, and sent, rather than being included in the blanking interval. In addition, the device information is not limited to information stored in the EDID ROM 112, and may include only the device information necessary for commencing communication.

Moreover, the confirmation of whether or not the communication partner is compliant with bi-directional communication (in other words, whether or not the transmission direction of frame data can be switched), can be omitted by using, for example, the configuration described below. Information regarding whether or not the device is compliant with bi-directional communication is stored in the EDID ROM 112 or another ROM (not shown) in advance. The communication apparatuses (for example, the HDR 300 and the HDR-equipped DTV 500) may then exchange this information regarding whether or not they are compliant with bi-directional communication when performing device authentication on one another prior to commencing the communication of data.

As described thus far, according to the present embodiment, the start command is included and sent within the frame data that is being sent, in the case where the transmission direction of the frame data is switched while the communication apparatus is sending the frame data. The transmission direction of the frame data is then switched after the frame data including the start command has been sent. If a start command is included in the frame data being received by the communication apparatus 100, the communication apparatus 100 switches the transmission direction of the frame data after the frame data including the start command has been received.

Through this, a communication apparatus that communicates data on a frame-by-frame basis can switch the transmission direction of data, and through this, bi-directional communication of data can be realized. It is also possible for the switching of the transmission direction to be performed in synchronization with frames.

Furthermore, if device information is included in the start command, using the DDC line 104 to transmit the device information after the transmission direction has been switched can be omitted from the process, which makes it possible to perform the transmission direction switch more quickly.

Finally, if information regarding whether or not the device is compliant with bi-directional communication is sent to the communication partner prior to commencing communication, transmission of a confirmation request when the transmission direction is switched can be omitted, which makes it possible to perform the transmission direction switch more quickly.

Second Embodiment

In the first embodiment, the start command and the confirmation request were included in the frame data, and sent/received. In the second embodiment, the start command and confirmation request are sent/received by the CEC command issuing/interpretation unit 108 (see FIG. 1). As a result, the communication apparatus 100 does not need to include a TMDS command issuing/interpretation unit 110. In other words, the communication apparatus 100 according to the second embodiment is equivalent to the communication apparatus 100 of the first embodiment without the TMDS command issuing/interpretation unit 110.

Figure 7:
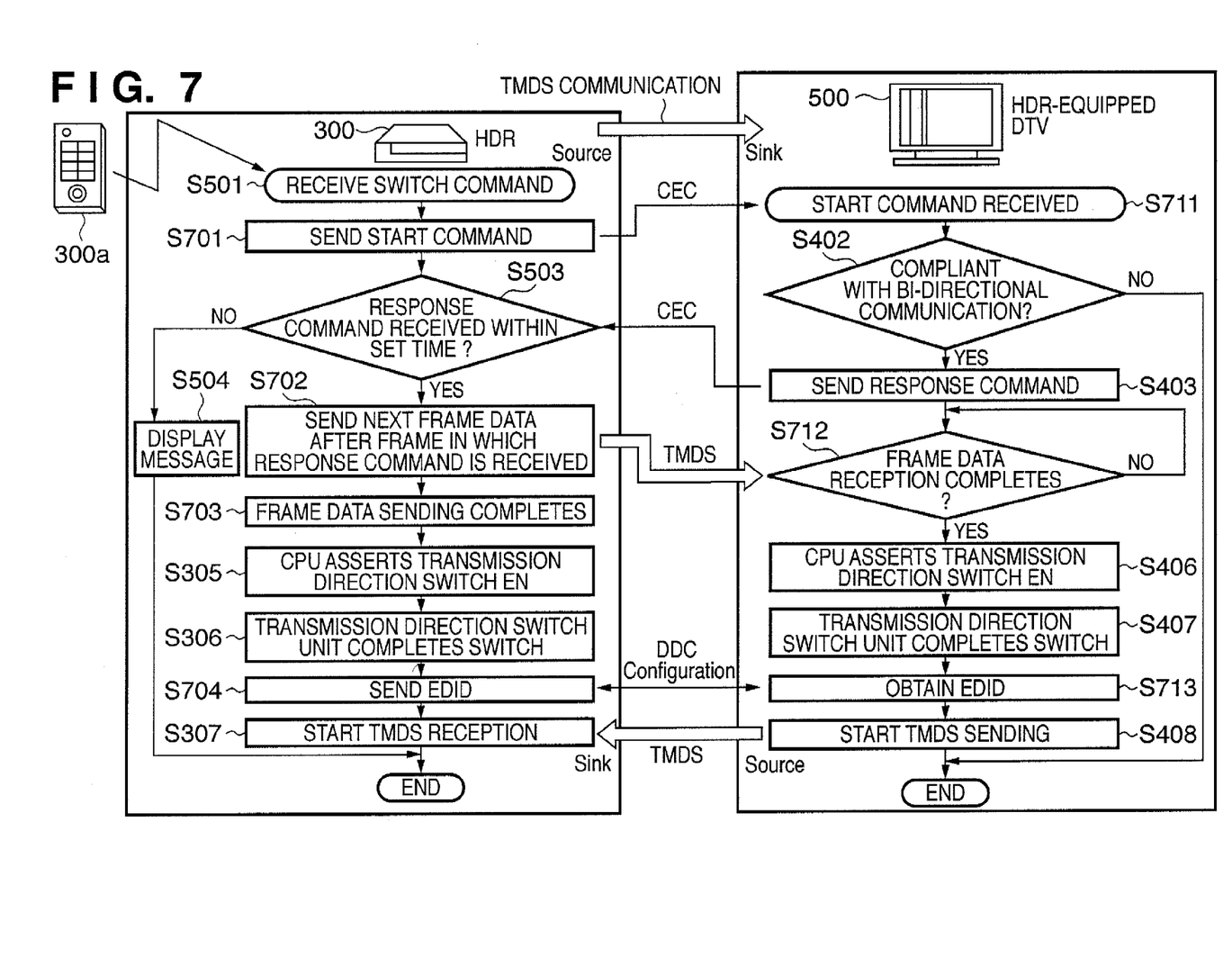
FIG. 7 is a flowchart illustrating the flow of a process for switching the transmission direction in a second embodiment of the present invention.
Figure 8:
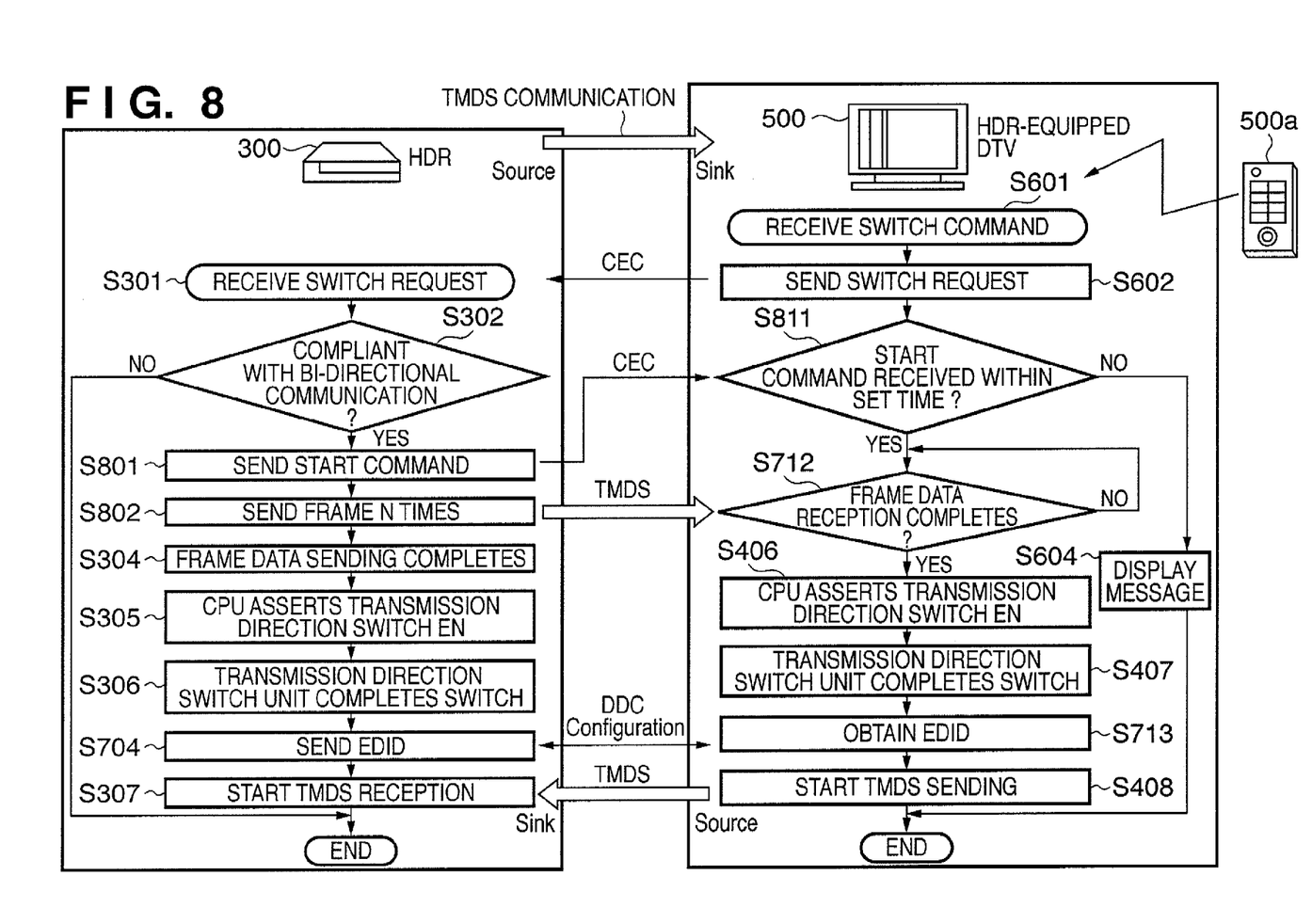
FIG. 8 is a flowchart illustrating the flow of a process for switching the transmission direction in the second embodiment of the present invention.

Hereinafter, the flow of processes for switching the transmission direction of frame data shall be described with reference to FIGS. 7 and 8. Similar to the first embodiment, there are four patterns for processes that switch the transmission direction of frame data in the present embodiment. These four patterns include: pattern 1, where a switch command is received, during the sending of the frame data, from a device different from the external device that is the communication partner (the HDR 300 in FIG. 7); pattern 2, where a confirmation request is received, during the reception of the frame data, from the external device that is the communication partner (the HDR-equipped DTV 500 in FIG. 7); pattern 3, where a switch request is received, during the sending of the frame data, from the external device that is the communication partner (the HDR 300 in FIG. 8); and pattern 4, where a switch command is received, during the reception of the frame data, from a device different from the external device that is the communication partner (the HDR-equipped DTV 500 in FIG. 8).

Patterns 1 and 2 shall be described hereinafter with reference to FIG. 7. Note that for the sake of simplicity, only the differences between the present embodiment and the first embodiment (see FIG. 5) shall be described, and thus steps that execute the same processes as in FIGS. 3, 4, and 5 shall be given the same reference numerals, and descriptions thereof shall be omitted.

First, pattern 1 shall be described.

S701 differs from S502, in that the CEC command issuing/interpretation unit 108 sends a start command. The start command in S701 also serves as a confirmation request, but does not include device information.

If in S503 a response command has been received within a pre-set amount of time, the procedure moves to S305, after the frame data currently being sent when the data communication unit 106 receives the response command (or the frame data sent after the frame data that is currently being sent) is sent in S702 and S703. In other words, a transmission direction switch synchronized with frames is realized by completing the sending of a pre-set number of frame data in S702 and S703, after the response command is received in S503.

In S704, the device information of the HDR 300 is sent via the DDC line 104. In the present embodiment, this step is necessary because a start command including the device information is not sent. However, as in the first embodiment, the device information may be exchanged prior to communication being commenced.

Next, pattern 2 shall be described.

S711 differs from S401, in that the CEC command issuing/interpretation unit 108 receives a start command. The start command in S711 also serves as a confirmation request, but does not include device information.

In S712, the CPU 111 waits until reception of the frame data via the data communication unit 106 is complete, and when the reception is complete, the procedure moves to S406. In other words, as opposed to the first embodiment (see S404 in FIG. 5), the CPU 111 executes the processes of S406 and after, using the frame data ceasing to be sent from the HDR 300 of the communication partner as a trigger.

In S713, the device information of the HDR 300 is received (obtained) via the DDC line 104. S713 is necessary for the same reason that S704 is necessary.

Note that in cases such as where it is not necessary to confirm whether or not the HDR-equipped DTV 500 is compliant with bi-directional communication, the start command need not serve as a confirmation request in S701 and S711. In such a case, S503, S402, and S403 in FIG. 7 can be omitted.

Next, patterns 3 and 4 shall be described with reference to FIG. 8. Note that for the sake of simplicity, only the differences between the present embodiment and the first embodiment (see FIG. 6) shall be described, and thus steps that execute the same processes as in FIGS. 3, 4, 6, and 7 shall be given the same reference numerals, and descriptions thereof shall be omitted.

First, pattern 3 shall be described.

S801 differs from S303, in that the CEC command issuing/interpretation unit 108 sends a start command. While the device information may be included in this start command, it is assumed, in present embodiment, that the device information is not included in the start command.

In S802, a time t, representing the time until the start command reaches the HDR-equipped DTV 500 and is interpreted, is calculated based on the communication speed of the CEC line 101 and the size of the data that makes up the start command, and the amount of frame data N that can be sent within the time t is computed by the CPU 111. Then, the data communication unit 106 sends frame data N times (or more than N times; in other words, a predetermined number of times or more), after which the procedure moves to S304. This prevents the sending of the frame data from ending before the HDR-equipped DTV 500 has finished preparing to switch the transmission direction of the frame data.

Next, pattern 4 shall be described.

S811 differs from S03, in that the CEC command issuing/interpretation unit 108 receives a start command. After the start command is received, the procedure moves to S712, where the CPU 111 switches the transmission direction of the frame data after waiting for the frame data to be received, similar to pattern 2.

It should be noted that in present embodiment, the confirmation as to whether or not the communication partner is compliant with bi-directional communication may be performed before communication has been commenced, as in the first embodiment.

Furthermore, the exchange of the device information may be carried out via the CEC line 101 prior to switching the transmission direction, at a time when there is sufficient bandwidth available in the CEC line 101.

As described thus far, in the present embodiment, the start command and confirmation request are sent/received by the CEC command issuing/interpretation unit 108.

As a result, the communication apparatus 100 does not need to include a TMDS command issuing/interpretation unit 110, making it possible to simplify the configuration of the communication apparatus 100.

Other Embodiments

The processing described in the above embodiments may be realized by providing a storage medium, storing program codes of software realizing the above-described functions, to a computer system or apparatus. By reading the program codes stored in the storage medium with a computer (or a CPU or MPU) of the system or apparatus and executing them, the functions of the above-described embodiments can be realized. In this case, the program codes read from the storage medium realize the functions according to the embodiments, and the storage medium storing the program codes constitutes the invention. The storage medium, such as a floppy disk, a hard disk, an optical disk, a magneto-optical disk and the like can be used for providing the program codes. Also, CD-ROM, CD-R, a magnetic tape, a non-volatile memory card, ROM, and the like can be used.

Furthermore, the functions according to the above embodiments are realized not only by executing the program codes read by the computer. The present invention also includes a case where an OS (operating system) or the like working on the computer performs part or the entire processes in accordance with designations of the program codes and realizes the functions according to the above embodiments.

Furthermore, the program codes read from the storage medium may be written in a function expansion card which is inserted into the computer or in a memory provided in a function expansion unit which is connected to the computer. Thereafter, a CPU or the like contained in the function expansion card or unit may perform part or the entire processes in accordance with designations of the program codes and may realize the functions of the above embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-050225, filed on Feb. 28, 2007, which is hereby incorporated by reference herein in its entirety.

What is claimed is:

1. A communication apparatus comprising:
   a data communication unit which performs half-duplex communication of video frame data with an external device on a video frame-by-video frame basis;
   a switching unit which switches a transmission direction in which the data communication unit transmits the video frame data;
   a first control unit which, when the transmission direction is to be switched while the data communication unit is sending the video frame data, controls the data communication unit to include a start command for instructing a start of a transmission direction switch, in the video frame data that is being sent, and send the video frame data, as well as controls the switching unit to switch the transmission direction in response to completion of the sending of the video frame data that includes the start command; and
   a second control unit which, when the start command is included in video frame data that is being received by the data communication unit, controls the switching unit to switch the transmission direction in response to completion of the reception of the video frame data that includes the start command.

2. The communication apparatus according to claim 1, further comprising:
a control signal communication unit which communicates control signals with the external device asynchronously with respect to communication by the data communication unit,
wherein the control performed by the first control unit is executed when the control signal communication unit has received a switch request that requests the transmission direction to be switched.

3. The communication apparatus according to claim 2, further comprising:
a receiving unit which receives a switch command, instructing the transmission direction to be switched, from a device different from the external device,
wherein the control performed by the first control unit is also executed when the receiving unit has received the switch command.

4. The communication apparatus according to claim 3, further comprising:
a third control unit which, when the switch command has been received while the data communication unit is receiving the video frame data, controls the control signal communication unit to send the switch request, as well as controls the switching unit to switch the transmission direction in response to completion of the reception of the video frame data that includes the start command, the start command serving as a response to the switch request.

5. The communication apparatus according to claim 4, further comprising:
a fourth control unit which, when the switch command has been received while the data communication unit is sending the video frame data, controls the data communication unit to include a confirmation request, for confirming whether or not the transmission direction can be switched, in the video frame data that is being sent, and send the video frame data, and causes the control performed by the first control unit to be executed when a response command indicating that the transmission direction can be switched has been received by the control signal communication unit as a response to the confirmation request.

6. The communication apparatus according to claim 5, further comprising:
a notification unit which notifies a user that the external device cannot switch the transmission direction when the video frame data including the start command has not been received within a predetermined first amount of time following the switch request being sent through the control performed by the third control unit, or when the response command has not been received within a predetermined second amount of time following the confirmation request being sent through the control performed by the fourth control unit.

7. The communication apparatus according to claim 2, wherein the video frame data has a blanking interval; and
at least one of the switch request and the start command is included within the blanking interval.

8. A communication apparatus comprising:
a data communication unit which performs half-duplex communication of video frame data with an external device on a video frame-by-video frame basis;
a control signal communication unit which communicates control signals with the external device asynchronously with respect to communication by the data communication unit;
a switching unit which switches a transmission direction in which the data communication unit transmits the video frame data;
a first control unit which, when the transmission direction is to be switched while the data communication unit is sending the video frame data, controls the control signal communication unit to send a start command for instructing a start of a transmission direction switch, as well as controls the switching unit to calculate an amount of video frame data that can be sent before the start command reaches the external device and is interpreted and switches the transmission direction in response to completion of the sending of video frame data of an amount greater than or equal to the calculated amount; and
a second control unit which, when the control signal communication unit has received the start command while the data communication unit is receiving video frame data, controls the switching unit to switch the transmission direction in response to completion of the reception of the video frame data by the data communication unit.

9. The communication apparatus according to claim 8,
wherein the control performed by the first control unit is executed when the control signal communication unit has received a switch request that requests the transmission direction to be switched.

10. The communication apparatus according to claim 9, further comprising:
a receiving unit which receives a switch command, instructing the transmission direction to be switched, from a device different from the external device,
wherein the control performed by the first control unit is also executed when the receiving unit has received the switch command.

11. The communication apparatus according to claim 10, further comprising:
a third control unit which, when the switch command has been received while the data communication unit is receiving the video frame data, controls the control signal communication unit to send the switch request, as well as controls the switching unit to switch the transmission direction in response to completion of the reception of the video frame data by the data communication unit.

12. The communication apparatus according to claim 11, further comprising:
a fourth control unit which, when the switch command has been received while the data communication unit is sending the video frame data, controls the first control unit so that the switching unit switches the transmission direction in response to completion of the sending of a predetermined amount of video frame data, after the control signal communication unit has received a response command indicating that the transmission direction can be switched as a response to the start command sent through the control of the first control unit.

13. The communication apparatus according to claim 12, further comprising:
a notification unit which notifies a user that the external device cannot switch the transmission direction when the start command has not been received within a predetermined first amount of time following the sending of the switch request through the control of the third control unit, or in the case where the response command has not been received within a predetermined second amount of time following the sending of the start command through the control of the first control unit.

14. A control method for a communication apparatus, the communication apparatus including a data communication unit which performs half-duplex communication of video frame data with an external device on a video frame-by-video frame basis and a switching unit which switches a transmission direction in which the data communication unit transmits the video frame data, the control method comprising:

controlling, when the transmission direction is to be switched while the data communication unit is sending the video frame data, the data communication unit to include a start command for instructing a start of a transmission direction switch, in the video frame data that is being sent, and send the video frame data, as well as controlling the switching unit to switch the transmission direction in response to completion of the sending of the video frame data that includes the start command; and controlling, when the start command is included in video frame data that is being received by the data communication unit, the switching unit to switch the transmission direction in response to completion of the reception of the video frame data that includes the start command.

15. A control method for a communication apparatus, the communication apparatus including a data communication unit which performs half-duplex communication of video frame data with an external device on a video frame-by-video frame basis, a control signal communication unit which communicates control signals with the external device asynchronously with respect to communication by the data communication unit, and a switching unit which switches a transmission direction in which the data communication unit transmits the video frame data, the control method comprising:

controlling, when the transmission direction is to be switched while the data communication unit is sending the video frame data, the control signal communication unit to send a start command for instructing a start of a transmission direction switch, as well as controlling the switching unit to calculate an amount of video frame data that can be sent in time until the start command reaches the external device and is interpreted and switch the transmission direction in response to completion of the sending of video frame data of an amount greater than or equal to the calculated amount; and controlling, when the control signal communication unit has received the start command while the data communication unit is receiving video frame data, the switching unit to switch the transmission direction in response to completion of the reception of the video frame data by the data communication unit.

\* \* \* \* \*